United States Patent
Yen et al.

(10) Patent No.: US 9,240,828 B2
(45) Date of Patent: Jan. 19, 2016

(54) TRANSMITTING METHOD AND TRANSMISSION SYSTEM USING THE SAME

(71) Applicant: REALTEK SEMICONDUCTOR CORP., HsinChu (TW)

(72) Inventors: Kuang-Yu Yen, HsinChu (TW); Yu-Nan Lin, HsinChu (TW)

(73) Assignee: REALTEK SEMICONDUCTOR CORP., HsinChu (TW)

( * ) Notice: Subject to any disclaimer, the term of this patent is extended or adjusted under 35 U.S.C. 154(b) by 62 days.

(21) Appl. No.: 13/733,316

(22) Filed: Jan. 3, 2013

(65) Prior Publication Data
US 2013/0170529 A1 Jul. 4, 2013

(30) Foreign Application Priority Data
Jan. 3, 2012 (TW) .............................. 101100160 A (51) Int. Cl.
*H04B 3/46* (2015.01)
*H04B 17/00* (2015.01)
*H04Q 1/20* (2006.01)
*H04B 7/04* (2006.01)
*H04B 7/06* (2006.01)

(52) U.S. Cl.
CPC ............ *H04B 7/0456* (2013.01); *H04B 7/0669* (2013.01); *H04B 7/0689* (2013.01)

(58) Field of Classification Search
CPC ...... H04B 7/0669; H04B 7/0689; H04B 3/46; H04B 17/0042; H04B 17/004; H04B 7/0417; H04L 1/20; H04L 1/24; H04L 1/0618; H04L 1/06; H04L 25/0204; H04L 1/0003; H04L 1/0071; H04L 5/0007; H04L 1/0009; H04L 27/0008

USPC .......................................... 375/224, 295, 267
See application file for complete search history.

(56) References Cited

U.S. PATENT DOCUMENTS

| | | | |
|---|---|---|---|
| 8,165,532 B2* | 4/2012 | Saito ................................ | 455/69 |
| 8,498,195 B1* | 7/2013 | Lee et al. ....................... | 370/208 |
| 2005/0002468 A1* | 1/2005 | Walton et al. ................. | 375/267 |
| 2005/0237971 A1* | 10/2005 | Skraparlis ...................... | 370/329 |
| 2007/0135152 A1* | 6/2007 | Kim ................................ | 455/517 |
| 2009/0180458 A1* | 7/2009 | Roberts ........................ | 370/342 |
| 2010/0150007 A1 | 6/2010 | Jung et al. | |

(Continued)

FOREIGN PATENT DOCUMENTS

| | | |
|---|---|---|
| CN | 101039136 A | 9/2007 |
| TW | 200607273 | 2/2006 |

(Continued)

OTHER PUBLICATIONS

Alamouti, S., "A simple transmit diversity technique for wireless communications," IEEE Journal on Selected Areas in Communications, vol. 16, Issue: 8, 1998, pp. 1451-1458.*

(Continued)

*Primary Examiner* — Nader Bolourchi
(74) *Attorney, Agent, or Firm* — Rabin & Berdo, P.C.

(57) ABSTRACT

A transmitting method and transmission system using the same is applied to selectively use a space block-coding module to transmit a transmitted data. Each data stream of the transmission data is transmitted using the transmitting paths, and the transmission qualities of the transmitting paths are detected to decide whether the space-block encoding module works or not.

14 Claims, 9 Drawing Sheets

(56) References Cited

U.S. PATENT DOCUMENTS

| | | | |
|---|---|---|---|
| 2010/0165967 A1* | 7/2010 | Kim | 370/338 |
| 2011/0116575 A1* | 5/2011 | Lin et al. | 375/299 |
| 2011/0261774 A1* | 10/2011 | Lunttila et al. | 370/329 |
| 2011/0317679 A1* | 12/2011 | Jain | 370/338 |

FOREIGN PATENT DOCUMENTS

| | | | | |
|---|---|---|---|---|
| TW | 200607273 A | | 2/2006 | |
| TW | 200926685 | * | 6/2009 | H04L 12/28 |
| TW | 200926685 A | | 6/2009 | |

OTHER PUBLICATIONS

N.S. Murthy, S. Sri Gowri, and J.N.V. Saileela, "Transmit Diversity Technique for Wireless Communication over Rayleigh Channels Using 16 QAM Modulation Schemes," Trends in Networks and Communications, International Conferences NeCoM, WeST, WiMoN 2011, Chennai, India, Jul. 2011, Proceedings, Communications in Computer and Information Science 197, S.*

Taiwan Patent Office, Office Action, Patent Application Serial No. TW101100160, Jan. 24, 2014, Taiwan.

China Patent Office, Office Action issued on Feb. 25, 2015.

* cited by examiner

TRANSMITTING METHOD AND TRANSMISSION SYSTEM USING THE SAME

CROSS-REFERENCES TO RELATED APPLICATIONS

This non-provisional application claims priority under 35 U.S.C. §119(a) on Patent Application No. 101100160 filed in Taiwan, R.O.C. on 2012 Jan. 3, the entire contents of which are hereby incorporated by reference.

BACKGROUND

1. Technical Field

The disclosure generally relates to a transmitting method for a wireless communication and method thereof and, in particular, relates to a transmitting method and transmission system using the same.

2. Related Art

In order to fulfill the needs for wireless broadband and high-speed data transmission, how to effectively utilize spatial resources becomes an important direction of development of the wireless communication technology.

Since wireless communication systems using orthogonal frequency division multiplexing (OFDM) technology has many advantages, new generation wireless communication system, such as WLAN (IEEE 802.11a/g/n Wireless Local Area Network), WiMAX (IEEE 802.16 Worldwide Interoperability for Microwave Access), DVB-T/H (Digital Video Broadcasting system for Terrestrial/Handheld), UWB (Ultra Wide Band system), 3GPP-LTE (3rd Generation Partner Project for Long-Term Evolution), etc., is usually applied with multi-input multi-output (MIMO) technology.

Space-time block-coding (STBC) is a type of transmit diversity block coding, and is suitable for MIMO-OFDM communication systems. In STBC, each data stream is transmitted via multiple transmitting paths, and the power consumption of the wireless communication system is relatively increased.

Consequently, for battery operated communications systems utilizing STBC technique, balancing the transmission performance and the power consumption is an important concern to be addressed.

SUMMARY

In an embodiment, a transmitting method includes processing a transmitted data to generate a plurality of data streams using a processing module; transmitting the data streams by using a plurality of transmitting paths, and determining transmission qualities of the transmitting paths; and determining whether at least one of the data streams is transmitted using a space block-coding module or not in response with the transmission qualities.

In an embodiment, a transmission system includes a processing module, a plurality of transmitting paths, a space block-coding module, a switch and a detecting circuit.

The space block-coding module is coupled to the transmitting paths. The switch is coupled between the processing module and one of the transmitting paths and between the processing module and the space block-coding module.

The detecting circuit detects transmission qualities of the transmitting paths to control the switch such that at least one of the data streams is transmitted using a space block-coding module.

As described, the transmitting method and transmission system using the same is capable of dynamically selecting the number of the transmitting paths used to transmit the signal and dynamically determining whether the space block-coding mode is executed or not, to balance transmission performance and power consumption.

BRIEF DESCRIPTION OF THE DRAWINGS

These and other features, aspects, and advantages of the embodiments will become better understood with regard to the following description, appended claims, and accompanying drawings, where:

DETAILED DESCRIPTION

The following detailed description refers to the accompanying drawings which show, by way of illustration, various embodiments in which the invention may be practiced. These embodiments are described in sufficient detail to enable those skilled in the art to practice these and other embodiments. The various embodiments are not necessarily mutually exclusive, as some embodiments can be combined with one or more other embodiments to form new embodiments. The following detailed description is therefore not to be taken in a limiting sense.

Figure 1:
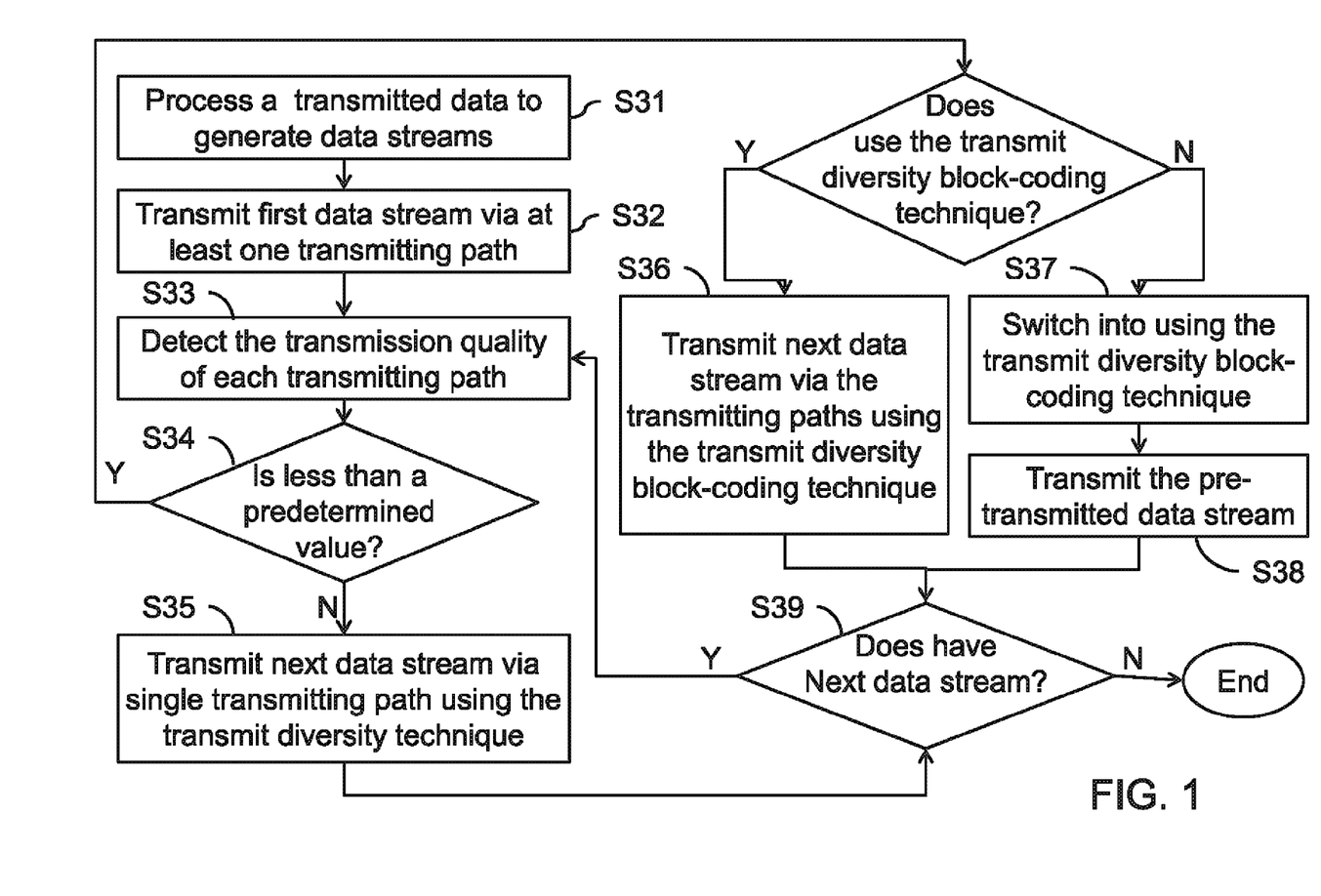
FIG. 1 is a flow diagram of the transmitting method according to first embodiment of the invention.
Figure 2:
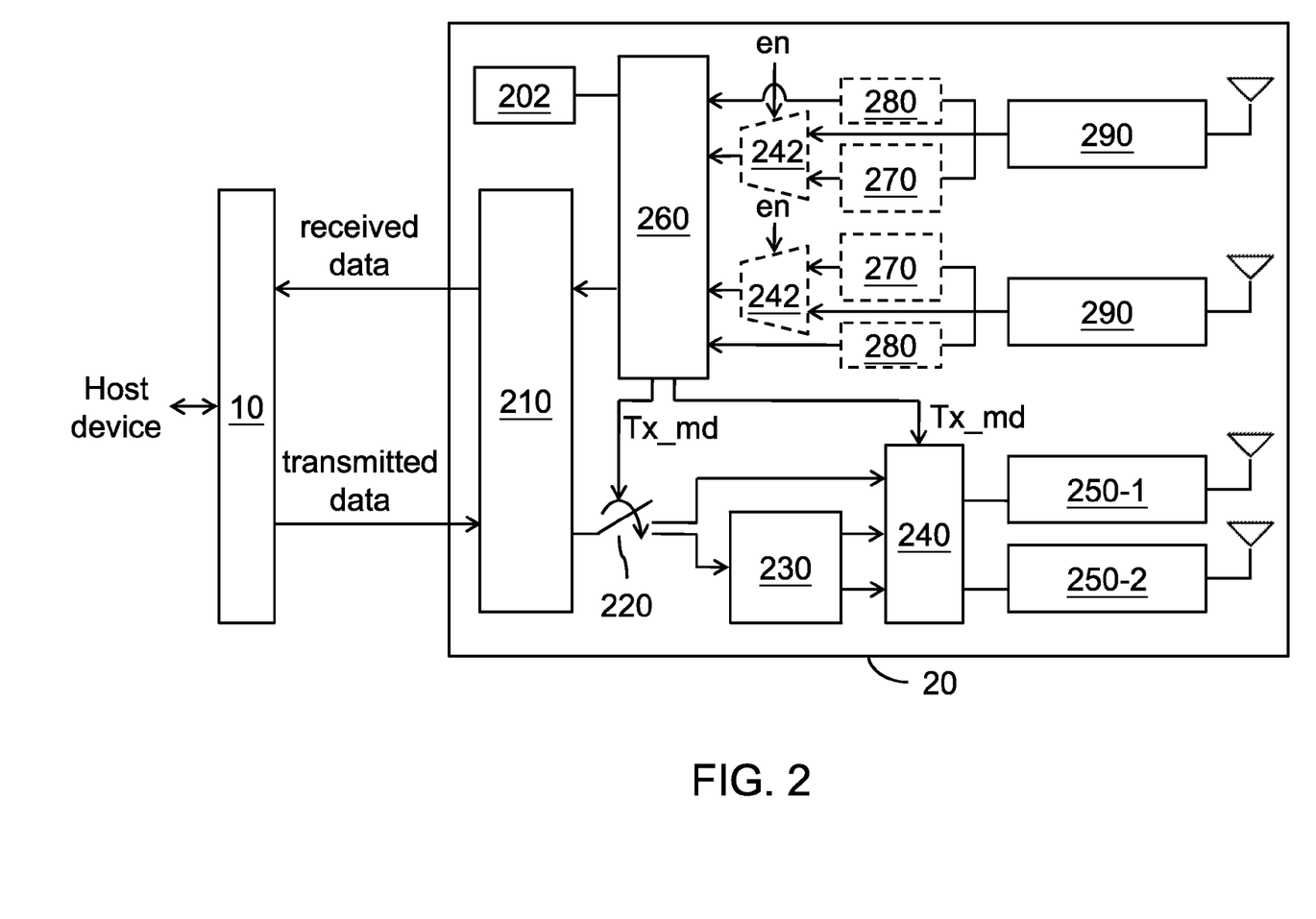
FIG. 2 is a block diagram of the transmission system according to first embodiment of the invention.

FIG. 1 is a flow diagram of the transmitting method according to first embodiment of the invention, and FIG. 2 is a block diagram of the transmission system according to first embodiment of the invention. The transmission system can include, but not limited to a radio-frequency (RF) system.

Please referring to FIG. 2, a wireless device includes a host-connecting interface 10 and a transmission system 20.

The wireless device is coupled to a host device by the host-connecting interface 10. Via the host-connecting interface 10, the wireless device receives the transmitted data to be wireless sent from the host device, and transmits the wireless received data to the host device.

In some embodiments, the wireless device can be implemented by an internal equipment of the host device or equipment coupled externally to the host device. The host device can be implemented by various computer hosts or various portable communication equipments.

The transmission system 20 includes a processing module 210 (also called a processing device), a switch 220, a space block-coding module 230 (also called a space block-coding device), transmitting paths 250-1, 250-2, a detecting circuit 260 and at least one receiving path 290.

Please referring to FIGS. 1 and 2, the processing module 210 processes signal conversion in accordance with the used wireless communication standard and bandwidth. During transmission, the processing module 210 receives the transmitted data from the host-connecting interface 10, and then processes it to generate a plurality of data streams (step S31). While receiving, the processing module 210 processes the received data streams to generate a received data, and then outputs the received data to the host-connecting interface 10.

In some embodiments, the transmitting portion of the processing module 210 is able to include an encoding module, a puncturing module, a first multiplex module, an interleaving module and a mapping module.

The host-connecting interface 10, the encoding module, the puncturing module, the first multiplex module, the interleaving module, the mapping module and the switch 220 are coupled in order. The encoding module transfers the transmitted data into the encoded data in accordance with one or more wireless communication standards. The puncturing module punctures the encoded data to generate the punctured encoded data. The interleaving module interleaves the punctured encoded data into the interleaved data flows. The mapping module maps the interleaved data flows into the data streams and outputs the data streams to the switch 220. Each data stream has one or more data symbols, and each data symbol has one or more complex signals.

Correspondingly, the receiving portion of the processing module 210 is able to include a decoding module, a de-puncturing module, a second multiplex module, a de-interleaving module and a de-mapping module.

The host-connecting interface 10, the decoding module, the de-puncturing module, the second multiplex module, the de-interleaving module, the de-mapping module and the detecting circuit 260 are coupled in order. Corresponding to the transmitting portion, the elements of the receiving portion backward processes the received data streams from the detecting circuit 260 to generate the received data, and then outputs the received data to the host-connecting interface 10.

The detecting circuit 260 detects the transmission quality of each transmitting path 250-1, 250-2 via the receiving path 290, and generates a control signal Tx_md according to the transmission quality of each transmitting path 250-1, 250-2 to control the switch of the switch 220 (Step S33). For example, the receiving path 290 includes a first receiving path and a second receiving path. The first receiving path and the second receiving path can use respective antennas or co-use one antenna. Moreover, the first receiving path, the second receiving path and the transmitting path 250-1, 250-2 can co-use one antenna. In this embodiment, the detecting circuit 260 can detect the transmission quality of each transmitting path 250-1 via the first receiving path, and detect the transmission quality of each transmitting path 250-2 via the second receiving path. In some embodiments, the detecting circuit 260 is coupled to a storage unit 202. The storage unit 202 stores a predetermined value preset. The detecting circuit 260 reads the predetermined value, compares the detected transmission quality of each transmitting path 250-1, 250-2 and the predetermined value (Step S34), and generates the control signal Tx_md according to the comparison result.

The switch 220 electrically conducts the processing module 210 to the space block-coding module 230 or the transmitting paths 250-1 according to the control signal Tx_md.

In some embodiments, first, the wireless device sends the first one of the data streams via the maximum number of transmitting paths 250-1, 250-2 (Step S32), i.e. via all transmitting paths 250-1, 250-2. The detecting circuit 260 detects the transmission quality of each transmitting path 250-1, 250-2 (Step S33), to control the switch operation of the switch 220. In other words, initially, the switch 220 electrically conducts the processing module 210 to the space block-coding module 230, such that the first data stream is wireless sent via the transmitting paths 250-1, 250-2 through the space block-coding module 230 using the transmit diversity block-coding technique.

In some embodiments, first, the wireless RF device sends the first one of the data streams via the minimum number of the transmitting paths 250-1, 250-2 (Step S32), for example, via one transmitting path 250-1. The detecting circuit 260 detects the transmission quality of each transmitting path 250-1, 250-2 (Step S33), to control the switch operation of the switch 220. In other words, initially, the switch 220 electrically conducts the processing module 210 to the transmitting path 250-1, such that the first data stream is wireless sent only via the transmitting path 250-1 using the transmit diversity technique.

When the detecting circuit 260 detects that the transmission quality of one of the transmitting paths 250-1, 250-2 is larger than or equal to the predetermined value (Step S34), the switch 220 electrically conducts the processing module 210 to one transmitting path 250-1 in response to the control signal Tx_md, such that the data stream is sent via single transmitting path 250-1 electrically conducted to the processing module 210 (Step S35).

When the detecting circuit 260 detects that the transmission quality of each transmitting path 250-1, 250-2 is less than the predetermined value (Step S34), the switch 220 electrically conducts the processing module 210 to the space block-coding module 230 in response to the control signal Tx_md (Step S36 and Step S37), such that the data stream is sent via the transmitting paths 250-1, 250-2 through the space block-coding module 230 using the transmit diversity block-coding technique (Step S36 and Step S38).

The space block-coding module 230 block-encodes the received data stream into the block-coded signals, and the block-coded signals are inputted into the transmitting paths 250-1, 250-2, respectively. Then, the block-coded signals are wireless sent via the respective transmitting paths 250-1, 250-2. That is, the number of the block-coded signals corresponds to the number of the transmitting paths.

When the transmitting terminal of the transmission system 20 wireless sends the signal using the transmit diversity block-coding technique, in the receiving terminal of another transmission system 20, the elements of the receiving portion include the space block-decoding module 270, as shown in FIG. 2. The space block-decoding module 270 is coupled between the receiving path 290 and the detecting circuit 260. The space block-decoding module 270 decodes the data stream received from the corresponding receiving path 290 using the space block-decoding technique.

Each space block-decoding module 270 is coupled to the detecting circuit 260 in response to the enable signal en representing the transmitting manner of the transmitting terminal. That is, when the transmitting terminal of the transmission system 20 transmits the data stream via the single transmitting path 250-1 using the transmit diversity technique without encoding using space block-coding technique, in the receiving terminal of another transmission system 20, only the receiving path 290 is electrically conducted to the detecting circuit 260 in response to the enable signal en, such that the data stream received by the receiving path 290 is directly transmitted to the processing module 210 through the detecting circuit 260 without being decoded by the space block-decoding module 270. When the transmitting terminal of the transmission system 20 transmits the data stream via the transmitting paths 250-1, 250-2 through the space block-coding module 230 using the transmit diversity block coding technique, in the receiving terminal of another transmission system 20, the receiving path(s) 290 is(are) electrically conducted to the space block-decoding module(s) 270 in response to the enable signal en, such that the data stream received by the receiving path 290 is decoded by the space block-decoding module 270 and then transmitted to the processing module 210 through the detecting circuit 260.

The detecting circuit 260 detects the transmission quality of each transmitting path 250-1, 250-2 according to the transmission of each data stream (Step S33), to determine the number of the transmitting path to be used in next transmission. For example, the detecting circuit 260 inversely estimates the transmission quality of each transmitting path with the received signal, such as ACK (ACKnowledge Character), signal, corresponding to the data stream wireless transmitted by the transmitting path.

After the switch 220 changes from electrically conducting the processing module 210 to the transmitting path 250-1 into electrically conducting the processing module 210 to the space block-coding module 230 in response to the control signal Tx_md (Step S37), the pre-data stream is wireless re-sent (Step S38), and then the remnant data streams are wireless sent in order (Step S39). In order words, after using the single transmitting path 250-1 is switched into using the transmitting paths 250-1, 250-2 by the switch 220 (Step S37), the pre-data stream is wireless re-sent via the transmitting paths 250-1, 250-2 through the space block-coding module 230 using the transmit diversity block coding technique (Step S38).

In some embodiments, the detecting circuit 260 detects the signal strength of the received signal corresponding to each transmitting path 250-1, 250-2, the channel frequency response of the receiving path corresponding to each transmitting path 250-1, 250-2 or the transmission rate of each transmitting path 250-1, 250-2 to acquire the transmission quality of each transmitting path 250-1, 250-2.

For the channel frequency response of the receiving path corresponding to each transmitting path 250-1, 250-2, in this case, a channel estimator 280 is coupled between the receiving path 290 and the detecting circuit 260.

When the transmitting terminal receives the signal from the receiving terminal, the channel estimator 280 estimates the channel parameter ($h_n(k)$) representing the transmission state from each transmitting path 250-1, 250-2 to the receiving terminal in each tone. As to $h_n(k)$, n represents the estimated transmitting path, and k represents the estimated tone.

The channel estimator 280 computes the transmission quality ($N_n$) of each transmitting path 250-1, 250-2 based on the threshold ($T_p$) and the corresponding channel parameter ($h_n(k)$) in accordance with the following equations.

$$N_n = \sum_{k \in K} u(|h_n(k)| - T_p)$$

$$u(x) = \begin{cases} 1, & \text{if } x \geq 0 \\ 0, & \text{else} \end{cases}$$

Here, K denotes a total of the tones for transmitting the signal by the wireless device (the transmission system 20).

Next, the detecting circuit 260 compares the transmission quality ($N_n$) of each transmitting path 250-1, 250-2 with the predetermined value to output the control signal Tx_md corresponding to the comparison result.

In some embodiments, the space block-coding module 230 can be implemented by a space-time block-coding (STBC) unit, a space-frequency block-coding (SFBC) unit or space-time-frequency block-coding (STFBC) unit.

The STBC unit is used for encoding the data stream using the STBC technique. The SFBC unit is used for encoding the data stream using the SFBC technique. The STFBC unit is used for encoding the data stream using the STFBC technique.

Figure 3:
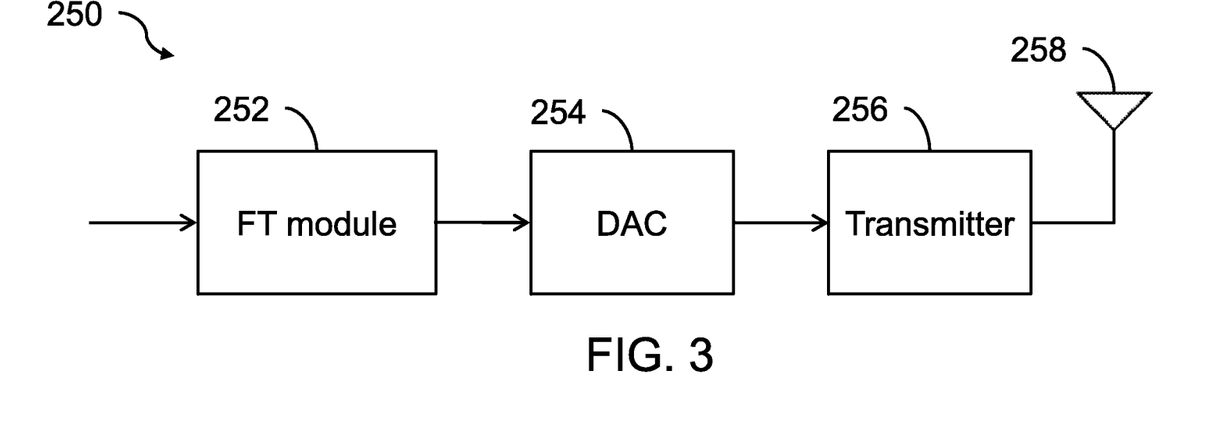
FIG. 3 is a block diagram of an embodiment of the transmitting path in accordance with the invention.

FIG. 3 is a block diagram of an embodiment of the transmitting path in accordance with the invention.

Referring to FIG. 3, in some embodiments, each transmitting path 250 includes an FT (Fourier Transform) module 252 (also called a FT device), a DAC (Digital to Analog Converter) 254, a transmitter 256 and an antenna 258.

The FT module 252, the DAC 254, the transmitter 256 and the antenna 258 are coupled in order.

The FT module 252 transforms the data stream from the switch 220 or the block-coded signal from the space block-coding module 230 into the symbol stream.

The DAC 254 converts the symbol stream into the analog signal(s) and outputs the analog signal into the transmitter 256. The transmitter 256 transforms the analog signal into the wireless signal, and wireless sends the wireless signal via the antenna 258 coupled thereto.

Figure 4:
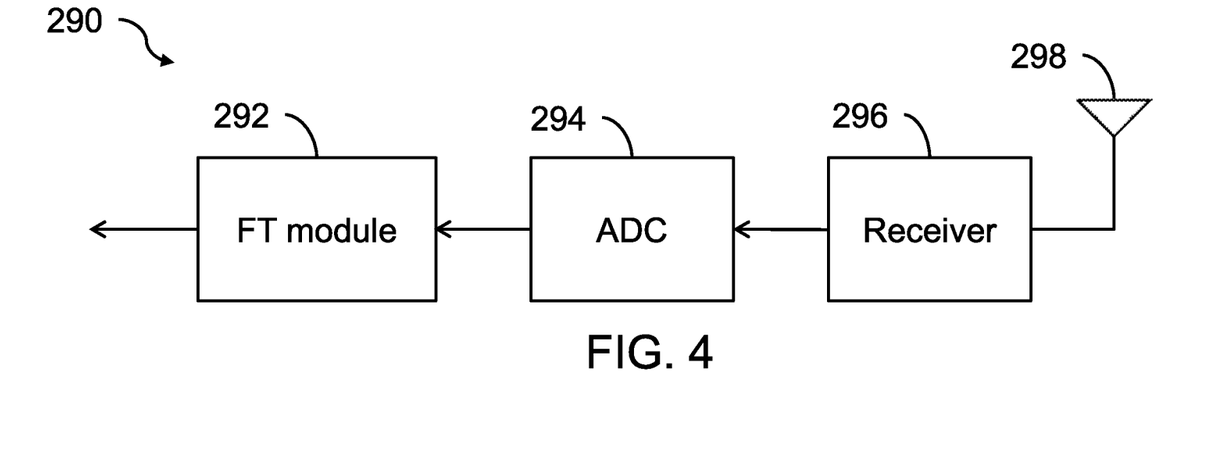
FIG. 4 is a block diagram of an embodiment of the receiving path in accordance with the invention.

FIG. 4 is a block diagram of an embodiment of the receiving path in accordance with the invention.

Referring to FIG. 4, in some embodiments, each receiving path 290 includes an FT (Fourier Transform) module 292, an ADC (Analog to Digital Converter) 294, a receiver 296 and an antenna 298.

The FT module 292, the ADC 294, the receiver 296 and the antenna 298 are coupled in order.

When the wireless device operates in the receiving mode, the receiver 296 receives one or more wireless signals via the antenna 298 and then transforms each wireless signal into the symbol stream.

The ADC 294 converts the symbol stream from the analog signal into the digital signal, and outputs the converted symbol stream into the FT module 292.

The FT module 292 transforms the converted symbol stream into the data stream or the block-coded signal. The signal transformed by the FT module 292 is transmitted to the space block-coding module 230 or the detecting circuit 260 according to the selection of the enable signal en.

Figure 5:
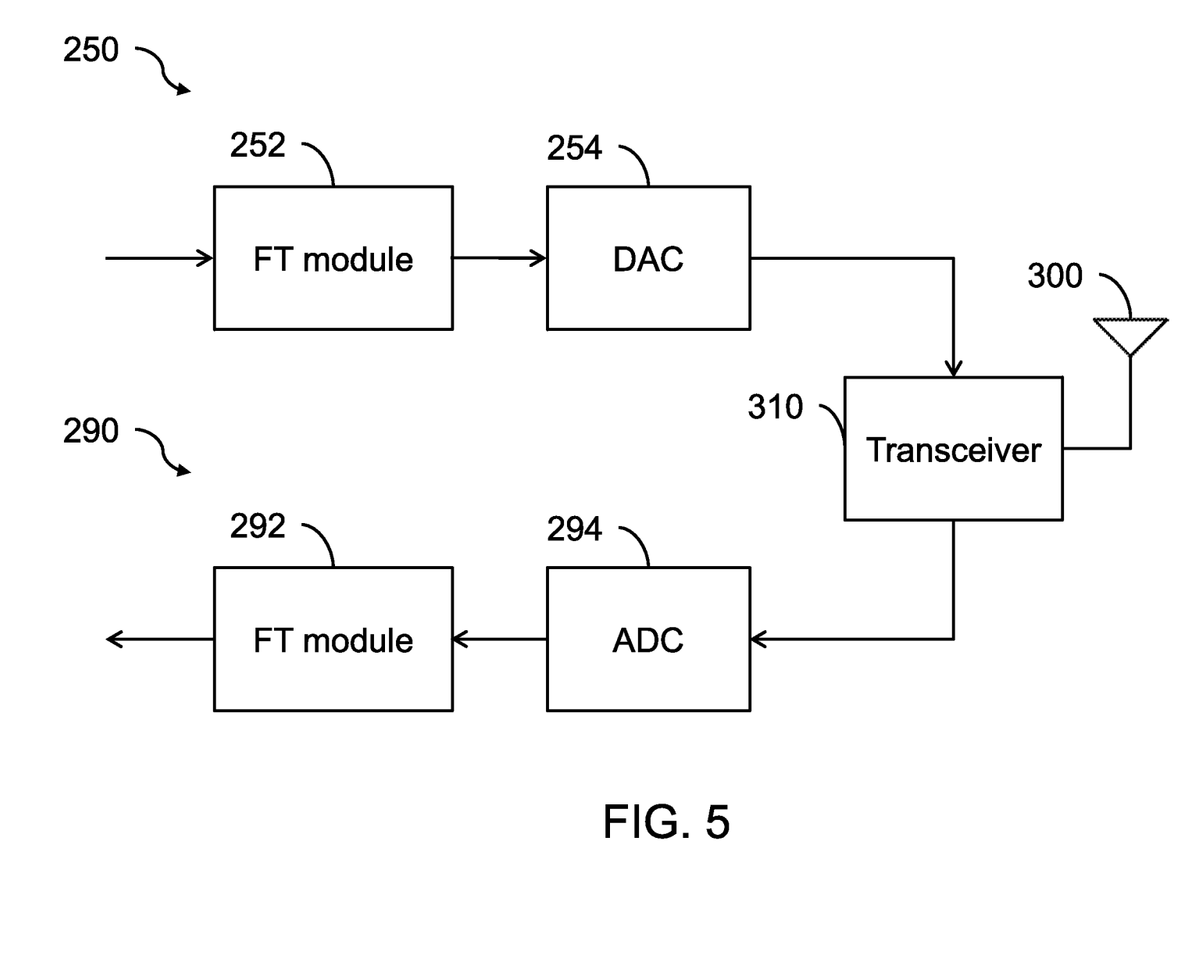
FIG. 5 is a block diagram of an embodiment of the combination of the transmitting path and the receiving path in accordance with the invention.

FIG. 5 is a block diagram of an embodiment of the combination of the transmitting path and the receiving path in accordance with the invention.

Referring to FIG. 5, in some embodiments, the transmitting path 250 and the receiving path 290 can share the antenna 300. Furthermore, the transmitter of the transmitting path 250 and the receiver of the receiving path 290 are integrated into a transceiver 310.

Referring again to FIG. 2, in some embodiments, there is a path selection module 240 (also called a path selection device) disposed as a pre-stage of the transmitting paths 250-1, 250-2.

The path selection module 240 is disposed between the switch 220 and the transmitting paths 250-1, 250-2 and between the space block-coding module 230 and the transmitting paths 250-1, 250-2. The path selection module 240 is coupled to the switch 220, the space block-coding module 230 and the transmitting paths 250-1, 250-2.

The path selection module 240 is also coupled to the detecting circuit 260, and receives the control signal Tx_md from the detecting circuit 260.

The path selection module 240 executes a path selection according to the control signal Tx_md, to electrically conduct the switch 220 to one of the transmitting paths 250-1, 250-2 or to each transmitting path 250-1, 250-2.

That is, when the detecting circuit 260 detects that the transmission quality of one of the transmitting paths 250-1, 250-2 is larger than or equal to the predetermined value, the switch 220 electrically conducts the processing module 210 to the path selection module 240 in response to the control signal Tx_md, and the path selection module 240 electrically conducts the switch 220 to one, the transmission quality of which is larger than or equal to the predetermined value, of the transmitting paths 250-1, 250-2, such that the processing module 210 is coupled to the transmitting path the transmission quality of which is larger than or equal to the predetermined value, thereby sending the data stream via single transmitting path electrically conducted to the processing module 210.

When the detecting circuit 260 detects that the transmission quality of each transmitting path 250-1, 250-2 is less than the predetermined value, the switch 220 electrically conducts the processing module 210 to the space block-coding module 230 in response to the control signal Tx_md, and the path selection module 240 electrically conducts the space block-coding module 230 to the corresponding transmitting paths 250-1, 250-2, thereby sending the data stream via the transmitting paths 250-1, 250-2 through the space block-coding module 230 using the transmit diversity block coding technique.

Furthermore, in the same transmission system 20, the transmitting terminal and the receiving terminal are not limited to both have the corresponding element(s) implementing the transmit diversity block-coding technique. That is, in one embodiment, in the same transmission system 20, the transmitting terminal thereof has the space block-coding module 230 and the related elements, such as the switch 220 and the path selection module 240, but the receiving terminal thereof does not have the space block-decoding module 270 and the related elements, such as the selection units 242. In another embodiment, in the same transmission system 20, the transmitting terminal thereof does not have the space block-coding module 230 and the related elements, but the receiving terminal thereof has the space block-decoding module 270 and the related elements. In yet another embodiment, in the same transmission system 20, the transmitting terminal thereof has the space block-coding module 230 and the related elements, but the receiving terminal thereof has the space block-decoding module 270 and the related elements.

In some embodiments, please referring to FIG. 2, there is a path selection module disposed as a post-stage of the receiving path 290, and the path selection module is used for determine whether the signal (the data stream), received by the receiving path 290 is decoded by the space block-decoding module using the space block-decoding technique.

The path selection module can include a plurality of selection units 242. Each receiving path 290 corresponds to one selection unit 242.

The input terminal of the selection unit 242 is coupled to the corresponding receiving path 290 and the corresponding space block-decoding module 270, and the output terminal of the selection unit 242 is coupled to the detecting circuit 260.

When the transmitting terminal of the transmission system 20 wireless transmits the signal via single transmitting path 250-1 using the transmit diversity technique without encoding using space block-coding technique, in the receiving terminal of another transmission system 20, the enable signal en enables the selection unit 242 to electrically conduct the space block-decoding module 270 to the detecting circuit 260, such that the signal (the data stream), received by the receiving path 290 is decoded by the space block-decoding module 270, and then the decoded signal is transmitted to the processing module 210 through the detecting circuit 260.

In FIG. 2, the transmission route between the switch 220 and the transmitting path 250-1 used when the signal is transmitted by the single transmitting path and the transmission route between the space block-coding module 230 and the same transmitting path 250-1 are disposed independently, but not limited thereto. In some embodiments, the transmission route between the switch 220 and the transmitting path used when the signal is transmitted by the single transmitting path can share with the space block-coding module 230, as shown in FIG. 6.

Figure 6:
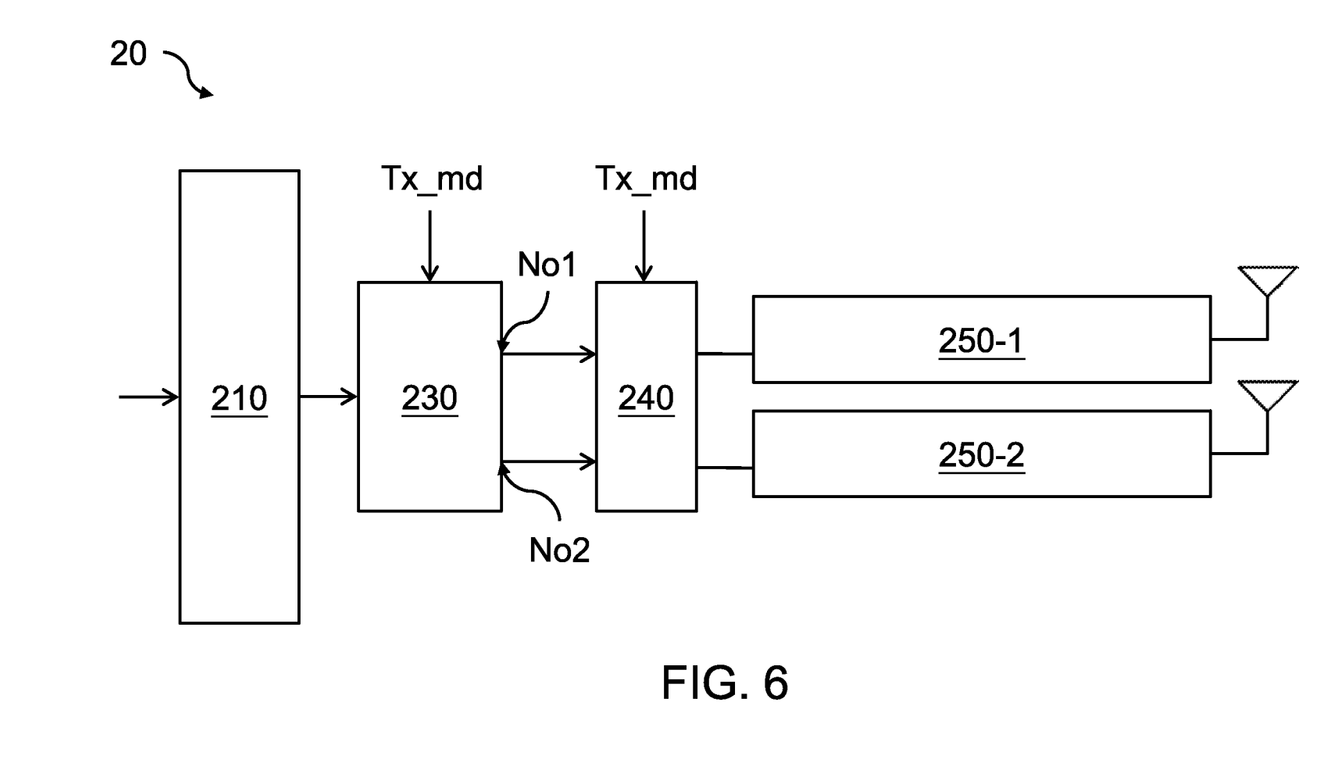
FIG. 6 is a block diagram of the transmitting portion in the transmission system according to second embodiment of the invention.

FIG. 6 is a block diagram of the transmitting portion in the transmission system according to second embodiment of the invention.

In other words, please referring to FIG. 6, the switch 220 is disposed inside the space block-coding module 230, and the inbuilt switch 220 is used for switching the operation of the space block-coding module 230.

Please referring to FIGS. 1 and 6, when the detecting circuit 260 detects that the transmission quality of one of the transmitting paths 250-1, 250-2 is larger than or equal to the predetermined value (Step S34), the control signal Tx_md disables the encoding process of the space block-coding module 230 with the space block-decoding technique, and the path selection module 240 electrically conducts a first output terminal No1 of the space block-coding module 230 to one of the transmitting paths 250-1, 250-2 in response to the control signal Tx_md, such that the space block-coding module 230 does not execute the encoding process with the space block-decoding technique, and passes through and outputs the data stream from the processing module 210 via the first output terminal No1, thereby wireless transmitting the data stream by using the single transmitting path 250-1 or 250-2 electrically conducted to the first output terminal No1 (Step S35).

When the detecting circuit 260 detects that the transmission quality of each transmitting path 250-1, 250-2 is less than the predetermined value (Step S34), the control signal Tx_md enables the encoding process of the space block-coding module 230 with the space block-decoding technique, and the path selection module 240 electrically conducts the first and second output terminals No1, No2 of the space block-coding module 230 to the corresponding transmitting paths 250-1, 250-2 in response to the control signal Tx_md (Step S36 and Step S37), such that the space block-coding module 230 executes the encoding process with the space block-decoding technique, and outputs the processed signals (the processed data streams), via the first and second output terminals No1, No2, respectively, thereby wireless transmitting the data stream via the transmitting paths 250-1, 250-2 through the space block-coding module 230 using the transmit diversity block-coding technique (Step S36 and Step S38).

Figure 7A:
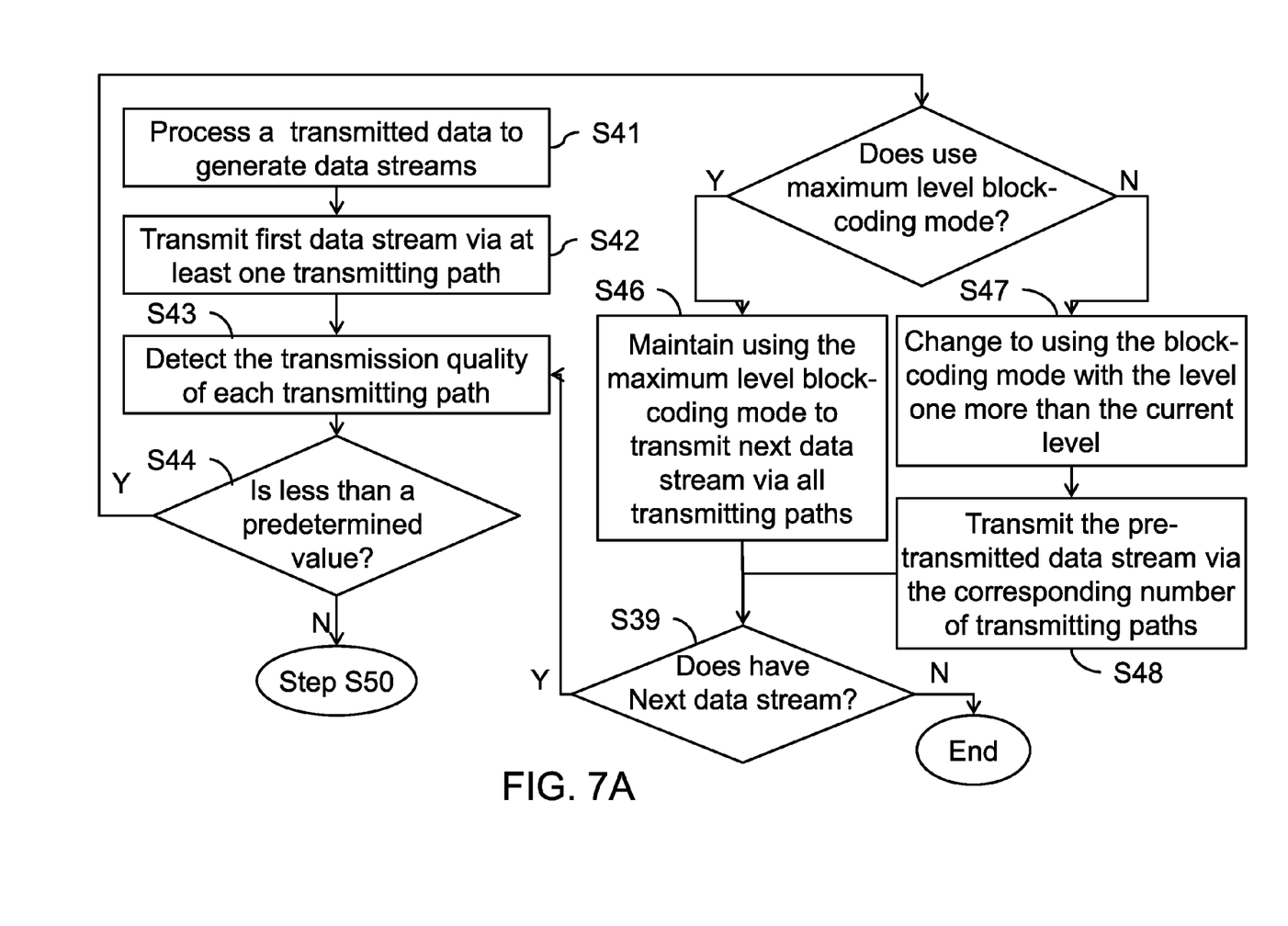
FIGS. 7A and 7B are flow diagrams of the transmitting method according to second embodiment of the invention.
Figure 7B:
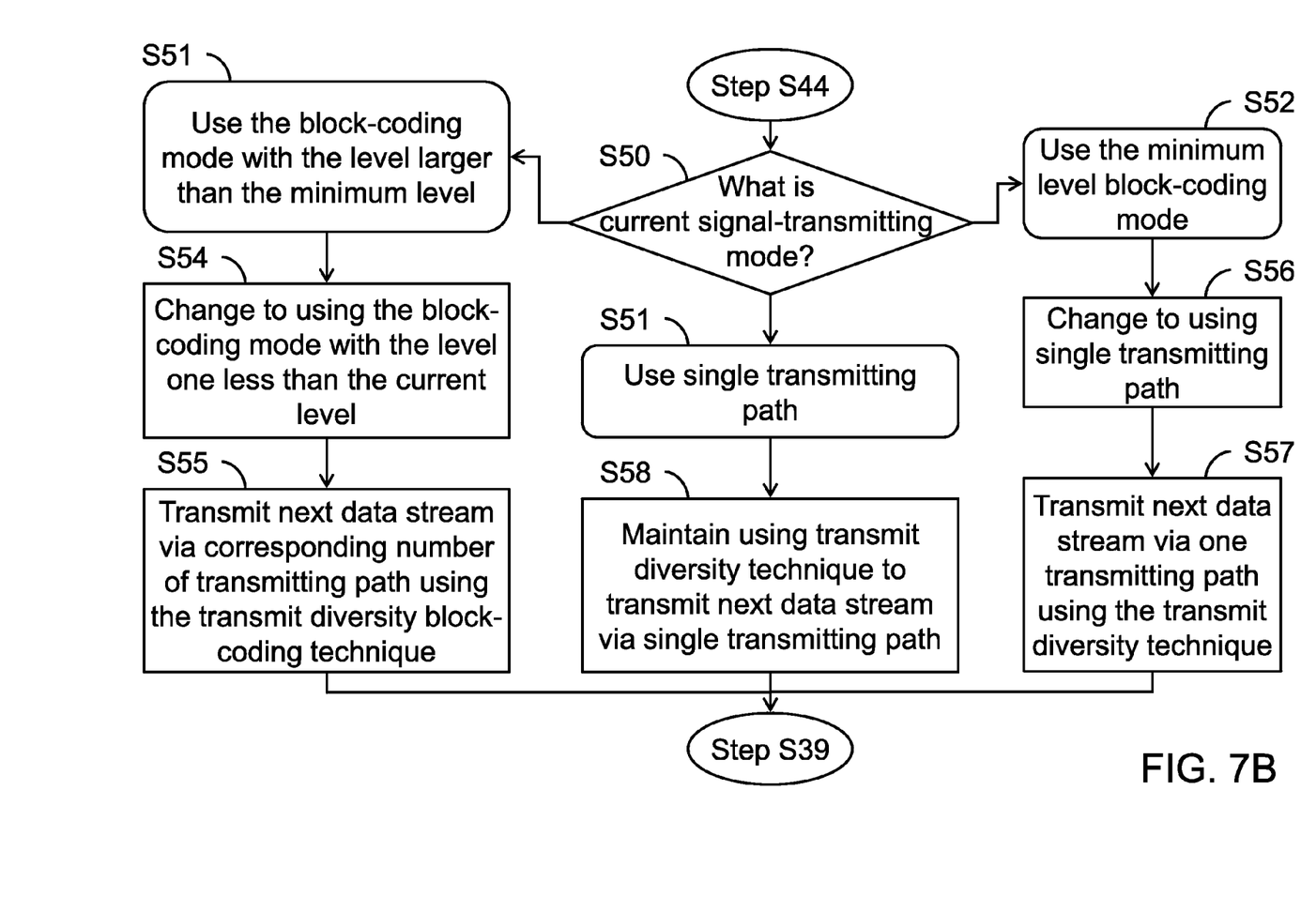
Figure 8:
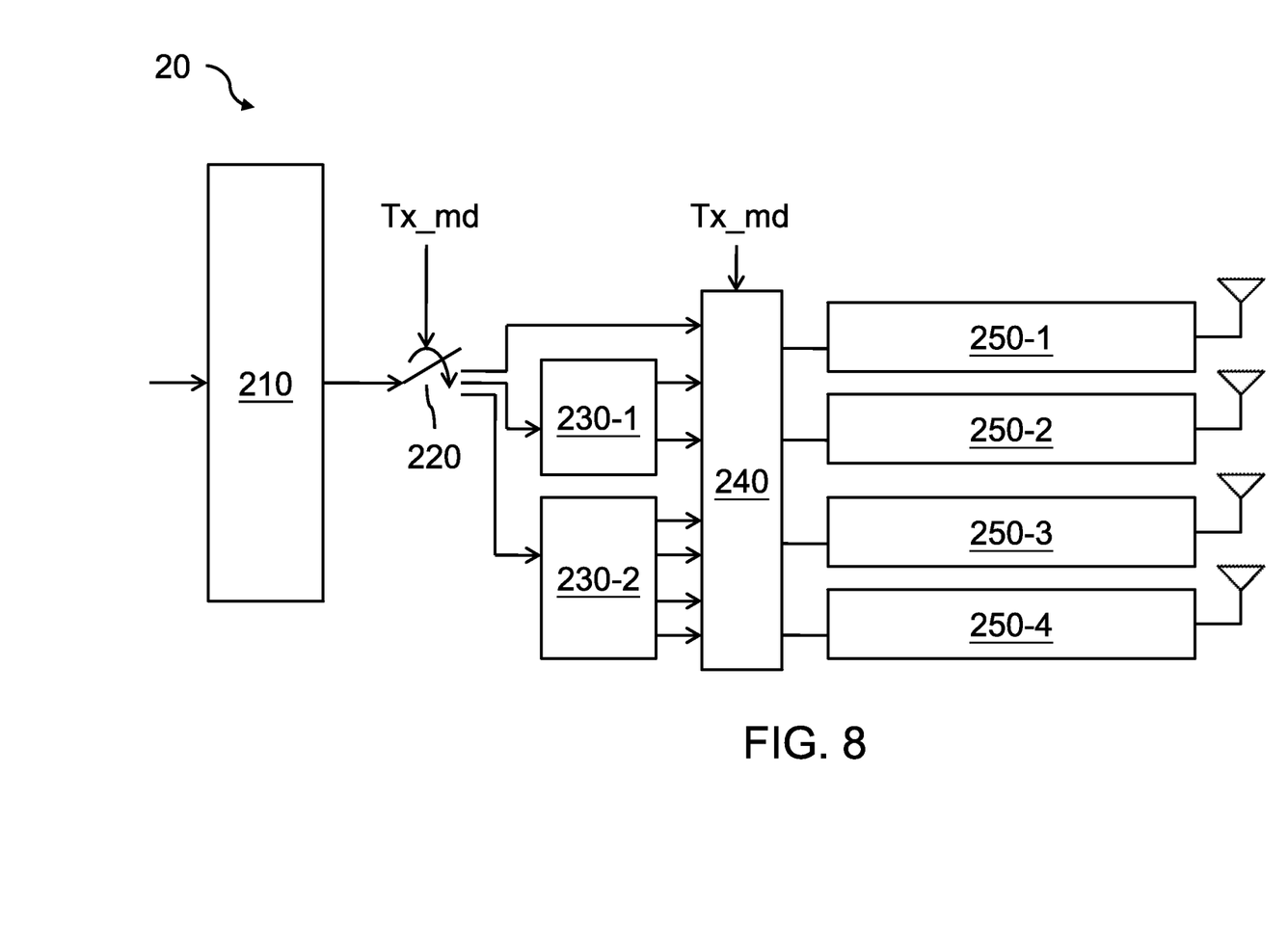
FIG. 8 is a block diagram of the transmitting portion in the transmission system according to third embodiment of the invention.

FIGS. 7A and 7B are flow diagrams of the radio-frequency (RF) transmitting method according to second embodiment of the invention, and FIG. 8 is a block diagram of the transmitting portion in the transmission system according to third embodiment of the invention. Here, step S44 shown in FIG. 7A is coupled to the step S50 shown in FIG. 7B, and steps S55, S57 and S58 shown in FIG. 7B are coupled to the step S39 shown in FIG. 7A.

In some embodiments, please referring to FIG. 8, the wireless device (the transmission system 20) has more than two transmitting paths 250-1, 250-2, 250-3, 250-4, and the space block-coding module 230 has a plurality of block-coding modes with different levels.

The block-coding modes corresponds to different number of transmitting paths to be used of all transmitting paths 250-1, 250-2, 250-3, 250-4 in the wireless device. Here, the maximum level block-coding mode corresponds to all transmitting paths 250-1, 250-2, 250-3, 250-4. The minimum level block-coding mode corresponds to at least two transmitting paths.

In other words, the space block-coding module 230 has a plurality of 1 to m block-coding modes, and m is an integer larger than or equal to 2 and less than or equal to y. Here, y is total number of the transmitting paths in the wireless device, and y is an integer larger than 2. Each 1 to m block-coding mode corresponds to m transmitting paths.

Please referring to FIGS. 7A and 8, after the processing module 210 processes the transmitted data to generate the data streams (step S41), the data streams are transmitted by one or more transmitting paths in order (step S42). After each data stream is transmitted, the detecting circuit 260 detects the transmission quality of each transmitting path (step S43), and determines the number of the transmitting paths to be used to transmit the data stream according to the detection (step S44).

When the detecting circuit 260 determines the number of the transmitting paths needs switching, the number of the transmitting paths is gradually switched.

When the detecting circuit 260 detects that the transmission quality of each transmitting path is less than the predetermined value (Step S44) and the transmission system 20 uses the maximum level block-coding mode, i.e. 1 to y block-coding mode (Step S45), the transmission system 20 maintains using the maximum level block-coding mode to wireless transmit next data stream via the corresponding transmitting paths using the transmit diversity block-coding technique (Step S46).

That is, after the current data stream is transmitted, the path selection module 240 maintains electrically conducting the space block-coding module 230 to y transmitting paths, and inputs the next data stream into the space block-coding module 230 with the maximum level block-coding mode. This space block-coding module 230 encodes the inputted data stream using 1 to y space block-coding technique, and then the encoded data streams are wireless transmitted by the y transmitting paths.

When the detecting circuit 260 detects that the transmission quality of each transmitting path is less than the predetermined value (Step S44) and the transmission system 20 does not use the maximum level block-coding mode, i.e. 1 to y block-coding mode (Step S45), the transmission system 20 changes to using the block-coding mode with the level one more than the current level in response to the control signal Tx_md (Step S47), and then wireless re-transmits the pre-transmitted data stream via the corresponding transmitting paths using the block-coding mode with the level one more than the current level and the transmit diversity block-coding technique (Step S48). In other words, when the detecting circuit 260 determines the number of the transmitting paths needs upgrading, the pre-transmitted data stream is wireless re-transmitted after upgrading, and then the next data stream is wireless transmitted.

When the detecting circuit 260 determines the number of the transmitting paths needs upgrading, the space block-coding module 230 switches from the 1 to i block-coding mode to 1 to j block-coding mode in response to the control signal Tx_md, and the path selection module 240 switches electrically conducting the space block-coding module 230 to from i transmitting paths to j transmitting paths in response to the control signal Tx_md, such that the pre-transmitted data stream is encoded by the space block-coding module 230 using 1 to j space block-coding technique, and then the encoded data streams are wireless transmitted by j transmitting paths. Here, i is an integer less than y and larger than or equal to 2, and j is an integer less than or equal to y and larger than i. In some embodiments, i is $2^I$, j is $2^{I+1}$, and is an integer larger than 1.

Please further referring to FIG. 7B, when the detecting circuit 260 detects that the transmission quality of at least one of the transmitting paths is larger than or equal to the predetermined value (Step S44) and the transmission system 20 uses the block-coding mode with the level larger than the minimum level (Step S51), the transmission system 20 changes to using the block-coding mode with the level one less than the current level in response to the control signal Tx_md (Step S54), and then wireless transmits next data stream via the corresponding transmitting paths using the block-coding mode with the level one less than the current level and the transmit diversity block-coding technique (Step S55).

That is, when the detecting circuit 260 determines the number of the transmitting paths needs downgrading, the space block-coding module 230 switches from the 1 to j block-coding mode to 1 to i block-coding mode in response to the control signal Tx_md, and the path selection module 240 switches electrically conducting the space block-coding module 230 to from j transmitting paths to i transmitting paths in response to the control signal Tx_md, such that the next data stream is encoded by the space block-coding module 230 using 1 to i space block-coding technique, and then the encoded data streams are wireless transmitted by i transmitting paths.

When the detecting circuit 260 detects that the transmission quality of at least one of the transmitting paths is larger than or equal to the predetermined value (Step S44) and the transmission system 20 uses the minimum level block-coding mode (Step S52), the transmission system 20 changes to using the single transmitting path (one of all transmitting paths) without using any block-coding mode in response to the control signal Tx_md (Step S56), and then wireless transmits next data stream via the one transmitting path using the transmit diversity technique without encoding using the space block-coding technique (Step S57).

That is, if the minimum level block-coding mode is 1 to 2 block-coding mode, when the detecting circuit 260 determines the number of the transmitting paths needs downgrading, the space block-coding module 230 with 1 to 2 block-coding mode disables in response to the control signal Tx_md, and the path selection module 240 switches from electrically conducting the space block-coding module 230 to two transmitting paths to electrically conducting the processing module 210 to the one transmitting path in response to the control signal Tx_md, such that the next data stream bypasses the space block-coding module 230 and is wireless transmitted by the transmitting path electrically conducted to the processing module 210.

When the detecting circuit 260 detects that the transmission quality of at least one of the transmitting paths is larger than or equal to the predetermined value (Step S44) and the transmission system 20 the single transmitting path without using any block-coding mode (Step S53), the transmission system 20 maintains using the single transmitting path to wireless transmit the pre-transmitted data stream or the next data stream (Step S58).

That is, when the transmission system 20 has used the minimum number of the transmitting path to wireless transmit the data stream, the path selection module 240 maintains electrically conducting the processing module 210 to the one transmitting path even if the detecting circuit 260 determines the number of the transmitting path needs downgrading, such that the next data stream bypasses the space block-coding module 230 and is wireless transmitted by the transmitting path electrically conducted to the processing module 210.

Additionally, the detecting step and the transmitting step repeat until all data streams are wireless transmitted.

For example, please referring to FIG. 8, the transmission system 20 has four transmitting paths 250-1, 250-2, 250-3, 250-4 and two space block-coding modules 230-1, 230-2.

The space block-coding module 230-1 is the 1 to 2 block-coding mode and corresponds to two transmitting paths. The selection of the path selection module 240 enables the space block-coding modules 230-1 to be coupled to two of the transmitting paths 250-1, 250-2, 250-3, 250-4.

The space block-coding module 230-2 is the 1 to 4 block-coding mode and corresponds to four transmitting paths 250-1, 250-2, 250-3, 250-4.

Initially, the switch 220 electrically conducts the processing module 210 to the input terminal of the space block-coding module 230-2, and the path selection module 240 electrically conducts the output terminal of the space block-coding module 230-2 to the corresponding transmitting paths 250-1, 250-2, 250-3, 250-4.

After the processing module 210 processes the transmitted data to generate the data streams, first one of data streams is inputted into and encoded by the space block-coding module 230-2, thereby being transmitted wirelessly via the transmitting paths 250-1, 250-2, 250-3, 250-4 using the transmit diversity block-coding technique.

Next, the detecting circuit 260 detects the transmission quality of each transmitting path 250-1, 250-2, 250-3, 250-4.

When the detecting circuit 260 detects that the transmission quality of each transmitting path 250-1, 250-2, 250-3, 250-4 is less than the predetermined value, the switch 220 and the path selection module 240 maintains the current conduction states, and second one of data streams is inputted into and encoded by the space block-coding module 230-2, thereby being transmitted wirelessly via the transmitting paths 250-1, 250-2, 250-3, 250-4 using the transmit diversity block-coding technique.

When the detecting circuit 260 detects that the transmission quality of at least one of the transmitting paths 250-1, 250-2, 250-3, 250-4 is larger than or equal to the predetermined value, the switch 220 switches into electrically conducting the processing module 210 to the input terminal of the space block-coding module 230-1 in response to the control signal Tx_md, and the path selection module 240 switches into electrically conducting the output terminal of the space block-coding module 230-1 to two of the transmitting paths 250-1, 250-2, 250-3, 250-4 in response to the control signal Tx_md. In some embodiments, the two transmitting paths electrically conducted to the space block-coding module 230-1 can be two with the best two transmission qualities among the transmitting paths 250-1, 250-2, 250-3, 250-4.

Next, the second data stream is inputted into and encoded by the space block-coding module 230-1, thereby being transmitted wirelessly via two transmitting paths electrically conducted the space block-coding module 230-1 using the transmit diversity block-coding technique. After transmitting, the detecting circuit 260 detects the transmission quality of each transmitting path 250-1, 250-2, 250-3, 250-4 again.

When the detecting circuit 260 detects that the transmission quality of each transmitting path 250-1, 250-2, 250-3, 250-4 is less than the predetermined value, the switch 220 switches into electrically conducting the processing module 210 to the input terminal of the space block-coding module 230-2 in response to the control signal Tx_md, and the path selection module 240 switches into electrically conducting the output terminal of the space block-coding module 230-2 to the transmitting paths 250-1, 250-2, 250-3, 250-4 in response to the control signal Tx_md. Then, the second data stream is inputted into and encoded by the space block-coding module 230-2, thereby being wireless re-transmitted via the transmitting paths 250-1, 250-2, 250-3, 250-4 using the transmit diversity block-coding technique.

When the detecting circuit 260 detects that the transmission quality of at least one of the transmitting paths 250-1, 250-2, 250-3, 250-4 is larger than or equal to the predetermined value, the switch 220 switches into electrically conducting the processing module 210 to the path selection module 240 in response to the control signal Tx_md, and the path selection module 240 switches into electrically conducting the switch 220 to one of the transmitting paths 250-1, 250-2, 250-3, 250-4 in response to the control signal Tx_md. In some embodiments, the transmitting path electrically conducted to the switch 220 can be one with the best transmission quality among the transmitting paths 250-1, 250-2, 250-3, 250-4.

The third data stream passes through the switch 220 and the path selection module 240, and then is inputted into the transmitting path coupled to the processing module 210, thereby being transmitted wirelessly via this transmitting path using the transmit diversity technique. After transmitting, the detecting circuit 260 detects the transmission quality of each transmitting path 250-1, 250-2, 250-3, 250-4 again.

When the detecting circuit 260 detects that the transmission quality of each transmitting path 250-1, 250-2, 250-3, 250-4 is less than the predetermined value, the switch 220 switches into electrically conducting the processing module 210 to the input terminal of the space block-coding module 230-1 in response to the control signal Tx_md, and the path selection module 240 switches into electrically conducting the output terminal of the space block-coding module 230-1 to two of the transmitting paths 250-1, 250-2, 250-3, 250-4 in response to the control signal Tx_md. Next, the third data stream is inputted into and encoded by the space block-coding module 230-1, thereby being wireless re-transmitted via two transmitting paths electrically conducted the space block-coding module 230-1 using the transmit diversity block-coding technique.

When the detecting circuit 260 detects that the transmission quality of at least one of the transmitting paths 250-1, 250-2, 250-3, 250-4 is larger than or equal to the predetermined value, the switch 220 and the path selection module 240 maintains the current conduction states to electrically conduct the processing module 210 to the path selection module 240, or the switch 220 and the path selection module 240 switch into electrically conducting the processing module 210 to another one of all transmitting paths, which has the best transmission quality. Then, fourth one of data streams passes through the switch 220 and the path selection module 240, and then is inputted into the transmitting path coupled to the processing module 210, thereby being transmitted wirelessly via this transmitting path using the transmit diversity technique.

The detecting step and the transmitting step repeat until all data streams are wireless transmitted.

In FIG. 8, the transmission route between the switch 220 and the transmitting path used when the signal is transmitted by the single transmitting path and the transmission route between the space block-coding module 230 and the same transmitting path 250-1 are disposed independently, but not limited thereto. In some embodiments, the transmission route between the switch 220 and the transmitting path used when the signal is transmitted by the single transmitting path can share with the space block-coding modules 230-1, 230-2, as shown in FIG. 9.

Figure 9:
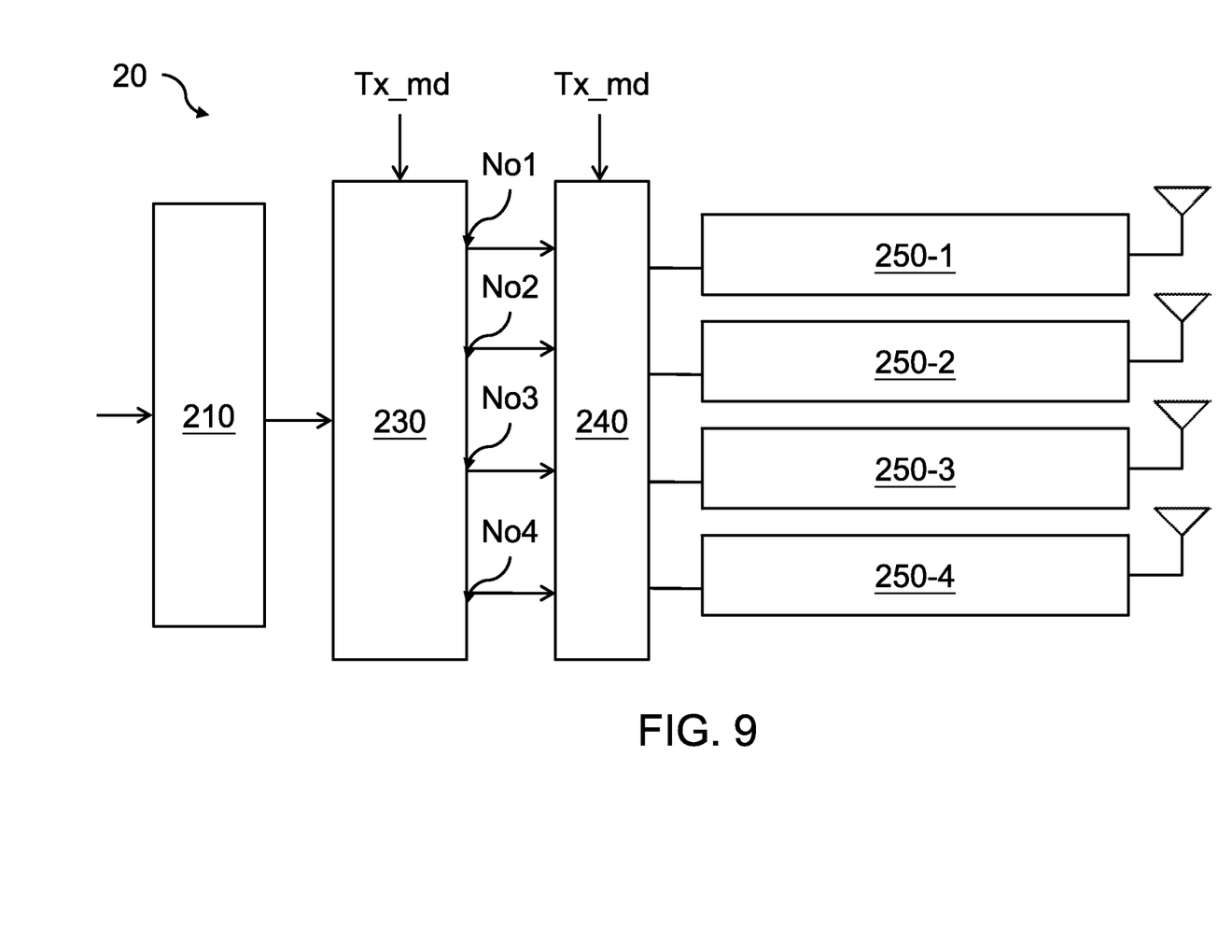
FIG. 9 is a block diagram of the transmitting portion in the transmission system according to fourth embodiment of the invention.

FIG. 9 is a block diagram of the transmitting portion in the transmission system according to fourth embodiment of the invention.

In other words, please referring to FIG. 9, the switch 220 is disposed inside the space block-coding module 230 being capable of executing several block-coding modes, and the inbuilt switch 220 is used for switching the operation of the space block-coding module 230. The operation of the transmission system 20 is substantially as described previously.

The operation of the aforesaid space block-coding module 230-2 is equal to the operation of the space block-coding module 230 executing 1 to 4 block-coding mode in response to the control signal Tx_md. When the space block-coding module 230 executes 1 to 4 block-coding mode in response to the control signal Tx_md, the path selection module 240 electrically conducts first, second, third and fourth output terminals No1, No2, No3, No4 of the space block-coding module 230 to the transmitting paths 250-1, 250-2, 250-3, 250-4 in response to the control signal Tx_md, respectively. That is, the first, second, third and fourth output terminals No1, No2, No3, No4 of the space block-coding module 230 are coupled to the transmitting paths 250-1, 250-2, 250-3, 250-4 one by one.

The operation of the aforesaid space block-coding module 230-1 is equal to the operation of the space block-coding module 230 executing 1 to 2 block-coding mode in response to the control signal Tx_md. When the space block-coding module 230 executes 1 to 2 block-coding mode in response to the control signal Tx_md, the path selection module 240 electrically conducts the first and second output terminals No1, No2 of the space block-coding module 230 to the transmitting paths 250-1, 250-2 in response to the control signal Tx_md, respectively. That is, the first and second output terminals No1, No2 of the space block-coding module 230 are coupled to the transmitting paths 250-1, 250-2 one by one. In this case, only the first and second output terminals No1, No2 of the space block-coding module 230 output the signals (the encoded data streams).

The operation of the aforesaid single transmitting path is equal to disabling the space block-coding module 230 and electrically conducting the processing module 210 to the first output terminal No1 of the space block-coding module 230. That is, the space block-coding module 230 does not execute encoding using space block-coding technique, and passes and outputs the data stream inputted by the processing module 210 via the first output terminal No1 thereof. Simultaneously, the path selection module 240 electrically conducts the first output terminal No1 of the space block-coding module 230 to any one of the transmitting paths 250-1, 250-2, 250-3, 250-4 in response to the control signal Tx_md. In this case, only the first output terminal No1 of the space block-coding module 230 outputs the signal (the data stream from the processing module 210).

In some embodiments, the elements between the host-connecting interface 10 and the transceiver 310, between the host-connecting interface 10 and the transmitter 256, and between the host-connecting interface 10 and the receiver 296 are implemented by one or more processors and one or more storage devices storing operation commands and firmware or software programs. The processer is, for example, microprocessor, microcontroller, digital signal processor (DSP), microcomputer, central processing unit (CPU), field programmable gate array (FPGA), programmable logic controller (PLC), stater, logic circuit, analog circuit, digital circuit or any device for processing the signal based on the operation command. The storage device is, for example, one or more storing units. The storing unit is, for example, read only memory (ROM), random access memory (RAM), non-volatile memory, volatile memory, static memory, dynamic memory, flash memory or any device for storing the data.

As described previously, the radio-frequency (RF) transmitting method and transmission system using the same according to the embodiments of the invention is capable of dynamically selecting the number of the transmitting paths to transmitting the signal and dynamically determining whether the space block-coding mode is executed or not, to balance the transmission performance and the power consumption. When the transmission system determines the signal have not to be transmitted by too many transmitting paths, i.e. the transmission qualities of the transmitting paths is enough good to decrease the number of the transmitting paths to be used, the transmission system executes the less level block-coding mode or does not use any block-coding mode, i.e. directly transmits the signal via the single transmitting path, to save the power consumption. When the transmission system determines the transmission qualities of the transmitting paths is not good, the transmission system executes the larger level block-coding mode, to provide better transmission performance.

While the present invention has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A transmitting method comprising:

processing a transmitted data to generate a plurality of data streams;

transmitting the plurality of data streams by using a plurality of transmitting paths, and computing a transmission quality of each of the plurality of transmitting paths based on a threshold and a corresponding channel parameter in accordance with the following equations:

$$N_n = \sum_{k \in K} u(|h_n(k)| - T_p)$$

$$u(x) = \begin{cases} 1, & \text{if } x \geq 0 \\ 0, & \text{else} \end{cases}$$

wherein $N_n$ denotes the transmission quality, $T_p$ denotes the threshold, $h_n(k)$ denotes the corresponding channel parameter, n is an integer representing an estimated transmitting path, k is an integer representing an estimated tone, and K denotes a total of tones for signal transmission of the transmission system; and determining whether at least one of the data streams is transmitted using space block-coding technique or not in response to the transmission qualities.

2. The method of claim 1, wherein the determining step comprises:
comparing each of the transmission qualities with a predetermined value;
when at least one of the transmission qualities is larger than or equal to a predetermined value, controlling a switch to electrically connect a data stream of the plurality of data streams directly to one of the plurality of transmitting paths, and transmitting a data stream of the plurality of data streams by the connected transmitting path; and
when the transmission qualities are less than a predetermined value, controlling a switch to electrically connect the data stream of the plurality of data streams to be coded using the space block-coding technique and then transmitted via at least one of the transmitting paths.

3. The method of claim 2, wherein the switch switches electrically connect the data stream of the plurality of data streams to from one of the plurality of transmitting paths to be coded using the space block-coding technique, and then the data stream is transmitted via at least one of the plurality of transmitting paths.

4. The method of claim 1, wherein the corresponding channel parameter is an estimation of a channel parameter of one path, corresponding to the transmitting path for computing, of at least one receiving path in each tone.

5. The method of claim 1, wherein the processing step comprises:
performing at least one of encoding, mapping and interleaving function on the transmitted data to generate the plurality of data streams.

6. The method of claim 1, wherein the space block-coding technique has a plurality of block-coding modes, and each of block-coding modes corresponds to different number of the transmitting paths among the plurality of transmitting paths.

7. The method of claim 6, wherein maximum level block-coding mode of the block-coding modes corresponds to all of the plurality of transmitting paths, and minimum level block-coding mode of the block-coding modes corresponds to at least two transmitting paths of the plurality of transmitting paths.

8. A transmission system comprising:
a processing device, for processing a transmitted data to generate a plurality of data streams;
a plurality of transmitting paths;
a space block-coding device, coupled to the plurality of transmitting paths;
a switch, coupled to the processing device;
a detecting circuit, for detecting transmission qualities of the plurality of transmitting paths to control the switch, the detecting circuit determining whether at least one of the plurality of data streams is transmitted using the space block-coding device or not; and
wherein a channel estimator computes the transmission quality of each of the plurality of transmitting paths based on a threshold and a corresponding channel parameter in accordance with the following equations:

$$N_n = \sum_{k \in K} u(|h_n(k)| - T_p)$$

$$u(x) = \begin{cases} 1, & \text{if } x \geq 0 \\ 0, & \text{else} \end{cases}$$

wherein $N_n$ denotes the transmission quality, $T_p$ denotes the threshold, $h_n(k)$ denotes the corresponding channel parameter, n is an integer representing an estimated transmitting path, k is an integer representing an estimated tone, and K denotes a total of tones for signal transmission of the transmission system.

9. The transmission system of claim 8 further comprising:
a path selection device, coupled to the switch, the space block-coding device and the plurality of transmitting paths.

10. The transmission system of claim 9, wherein at least one of the plurality of transmitting paths comprises:
a fourier transform (FT) device, coupled to the path selection device;
a digital to analog converter (DAC), coupled to the FT device;
a transmitter, coupled to the DAC; and
an antenna, coupled to the transmitter.

11. The transmission system of claim 8 further comprising:
at least one receiving path; and
wherein the channel estimator is coupled between the at least one receiving path and the detecting circuit.

12. The transmission system of claim 8, wherein the space block-coding device has a plurality of block-coding modes, and each of the block-coding modes corresponds to different number of the transmitting paths among the plurality of transmitting paths.

13. The transmission system of claim 12, wherein maximum level block-coding mode of the block-coding modes corresponds to all of the plurality of transmitting paths, and minimum level block-coding mode of the block-coding modes corresponds to at least two transmitting paths of the plurality of transmitting paths.

14. The transmission system of claim 8, wherein
when the detecting circuit detects at least one of the transmission qualities is larger than or equal to a predetermined value, the detecting circuit controls the switch to electrically connect the processing device to one of the plurality of transmitting paths, and then a data stream of the plurality of data streams is transmitted by the connected transmitting path; and
when the detecting circuit detects the transmission qualities are less than the predetermined value, the detecting circuit controls the switch to electrically connect a pre-processing device to the space block-coding device, and the data stream is transmitted via at least one of the plurality of transmitting paths through the space block-coding device.

* * * * *